United States Patent
Kano et al.

(10) Patent No.: US 11,289,959 B2
(45) Date of Patent: Mar. 29, 2022

(54) ROTOR AND ROTARY ELECTRIC MACHINE

(71) Applicants: KABUSHIKI KAISHA TOSHIBA, Minato-ku (JP); TOSHIBA INFRASTRUCTURE SYSTEMS & SOLUTIONS CORPORATION, Kawasaki (JP)

(72) Inventors: Masaru Kano, Ichikawa (JP); Hideki Hisada, Kuwana (JP); Masakatsu Matsubara, Mie (JP); Yusuke Matsuoka, Higashiosaka (JP)

(73) Assignees: KABUSHIKI KAISHA TOSHIBA, Minato-ku (JP); TOSHIBA INFRASTRUCTURE SYSTEMS & SOLUTIONS CORPORATION, Kawasaki (JP)

( * ) Notice: Subject to any disclaimer, the term of this patent is extended or adjusted under 35 U.S.C. 154(b) by 100 days.

(21) Appl. No.: 16/815,420

(22) Filed: Mar. 11, 2020

(65) Prior Publication Data

US 2020/0212738 A1 Jul. 2, 2020

Related U.S. Application Data

(63) Continuation of application No. PCT/JP2018/033720, filed on Sep. 11, 2018.

(30) Foreign Application Priority Data

Sep. 11, 2017 (JP) .............................. JP2017-174264

(51) Int. Cl.
*H02K 1/27* (2006.01)
*H02K 1/276* (2022.01)

(52) U.S. Cl.
CPC .................................. *H02K 1/276* (2013.01)

(58) Field of Classification Search
CPC ........... H02K 1/276; H02K 1/22; H02K 1/27; H02K 21/14; Y02T 10/64
See application file for complete search history.

(56) References Cited

U.S. PATENT DOCUMENTS

2010/0194221 A1* 8/2010 Kori ..................... H02K 1/2766
310/61
2010/0327689 A1 12/2010 Sakai et al.
(Continued)

FOREIGN PATENT DOCUMENTS

CN 101946386 A 1/2011
CN 102447354 A 5/2012
(Continued)

OTHER PUBLICATIONS

Machine Translation, Takashima, JP-2014007853-A, Jan. 2014. (Year: 2014).*

(Continued)

*Primary Examiner* — Thomas Truong
(74) *Attorney, Agent, or Firm* — Oblon, McClelland, Maier & Neustadt, L.L.P.

(57) ABSTRACT

According to one embodiment, a rotor includes a rotor core including magnetic poles arranged in a circumferential direction, a cavity formed on an axis q and extending toward a central axis, and a flux barrier band formed in the magnetic pole between a pair of the cavities to cross an axis d and including a first bridge part facing one cavity, a second bridge part facing the other cavity, and a magnet embedding hole formed between the first and the second bridge parts, a first permanent magnet formed of a fixed magnetic force magnet and disposed in the magnet embedding hole to be adjacent to the first bridge part, and a second permanent
(Continued)

magnet formed of a variable magnetic force magnet and disposed in the magnet embedding hole to be adjacent to the second bridge part.

8 Claims, 10 Drawing Sheets

(56) References Cited

U.S. PATENT DOCUMENTS

| | | | |
|---|---|---|---|
| 2011/0169364 A1* | 7/2011 | Maemura | H02K 1/2766 310/156.01 |
| 2011/0254474 A1 | 10/2011 | Saito et al. | |
| 2013/0127280 A1 | 5/2013 | Sugimoto et al. | |
| 2014/0375160 A1 | 12/2014 | Zhang et al. | |
| 2015/0001970 A1 | 1/2015 | Zhang et al. | |
| 2015/0001977 A1 | 1/2015 | Zhang et al. | |
| 2015/0001980 A1 | 1/2015 | Zhang et al. | |
| 2015/0340915 A1 | 11/2015 | Kato et al. | |
| 2017/0117762 A1 | 4/2017 | Takahata et al. | |
| 2017/0279322 A1 | 9/2017 | Sasaki et al. | |
| 2018/0219463 A1 | 8/2018 | Sasaki et al. | |

FOREIGN PATENT DOCUMENTS

| | | | |
|---|---|---|---|
| JP | 2006-280195 A | | 10/2006 |
| JP | 4764526 B2 | | 9/2011 |
| JP | 2012-80713 A | | 4/2012 |
| JP | 2013-176292 A | | 9/2013 |
| JP | 2014-7852 A | | 1/2014 |
| JP | 2014-7853 A | | 1/2014 |
| JP | 2014007853 A | * | 1/2014 |
| JP | 5650276 B2 | | 1/2015 |
| JP | 2015-521838 A | | 7/2015 |
| JP | 2015-159691 A | | 9/2015 |
| JP | 2015-186268 A | | 10/2015 |
| JP | 2015186268 A | * | 10/2015 |
| JP | 2017-11858 A | | 1/2017 |
| JP | 2017-17783 A | | 1/2017 |
| JP | 2017-528107 A | | 9/2017 |
| JP | 2018-522524 A | | 8/2018 |
| WO | WO 2012/014260 A1 | | 2/2012 |
| WO | WO 2014/188757 A1 | | 11/2014 |
| WO | WO 2015/159658 A1 | | 10/2015 |

OTHER PUBLICATIONS

Machine Translation, Sakai, JP-2015186268-A, Oct. 2015. (Year: 2015).*

International Search Report dated Dec. 11, 2018 in PCT/JP2018/033720 filed Sep. 11, 2018, citing documents AA and AH-AI therein, 2 pages Kato, T. et al., "Magnetization controllability of variable flux IPMSMs using series lamination magnet for vehicle traction drive," 2016 IEE-Japan Industry Applications Society Conference (JIASC2016), 2016, pp. [III-221]- [III-224] (with English Translation).

Extended European Search Report dated Apr. 20, 2021 in European Patent Application No. 18853939.9, citing document AA therein, 8 pages.

* cited by examiner

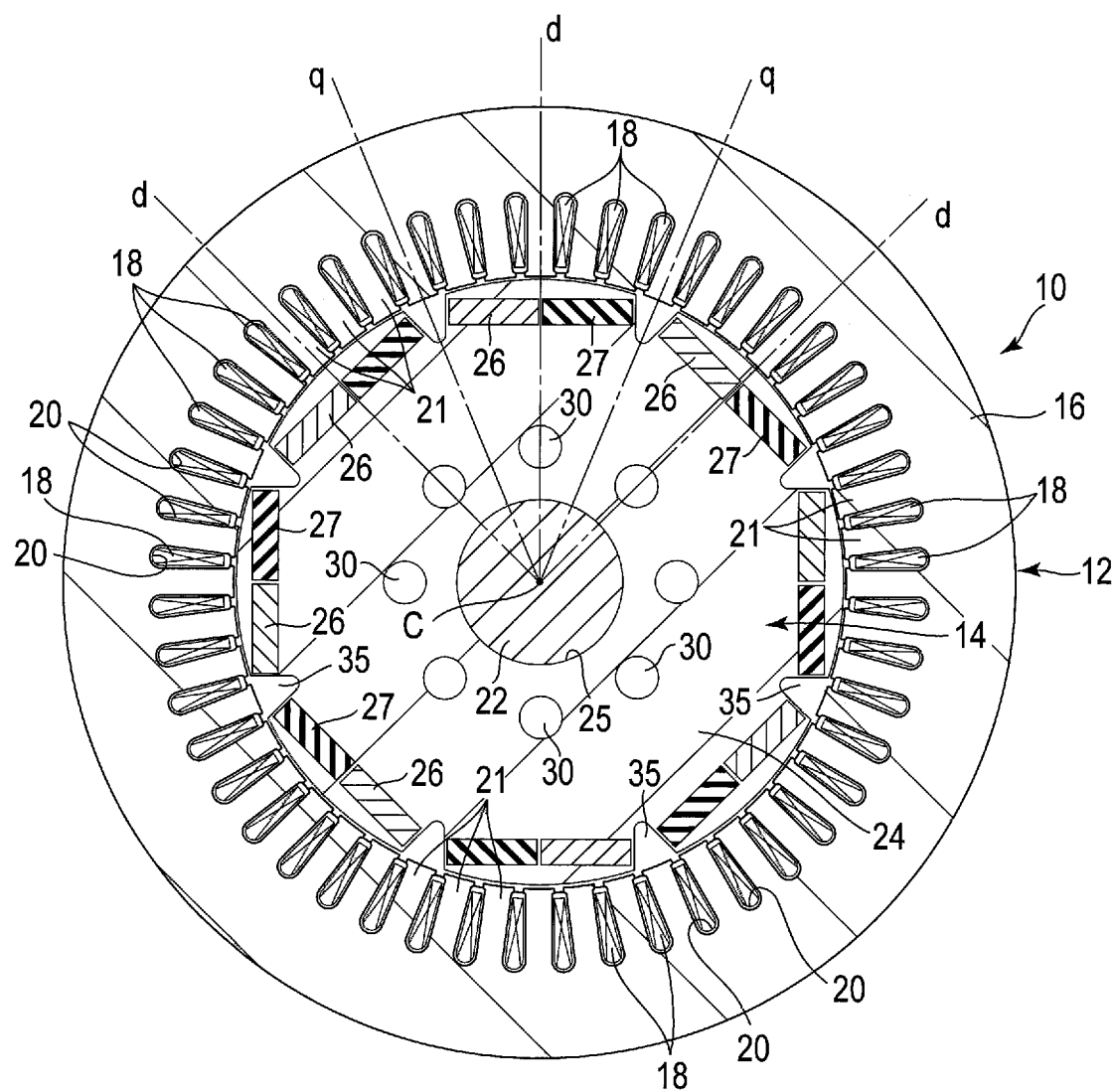
F I G. 1

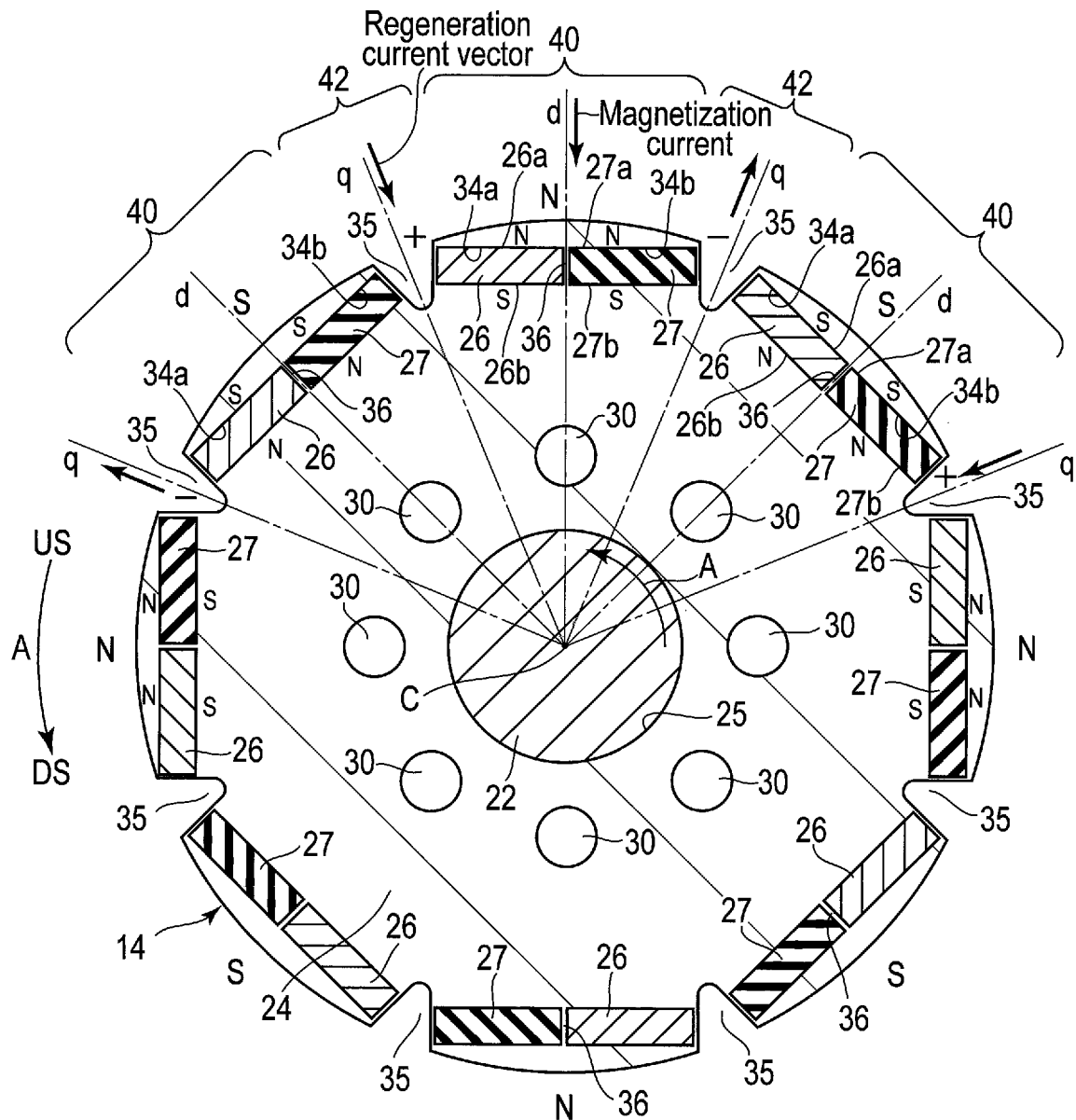
F I G. 2A

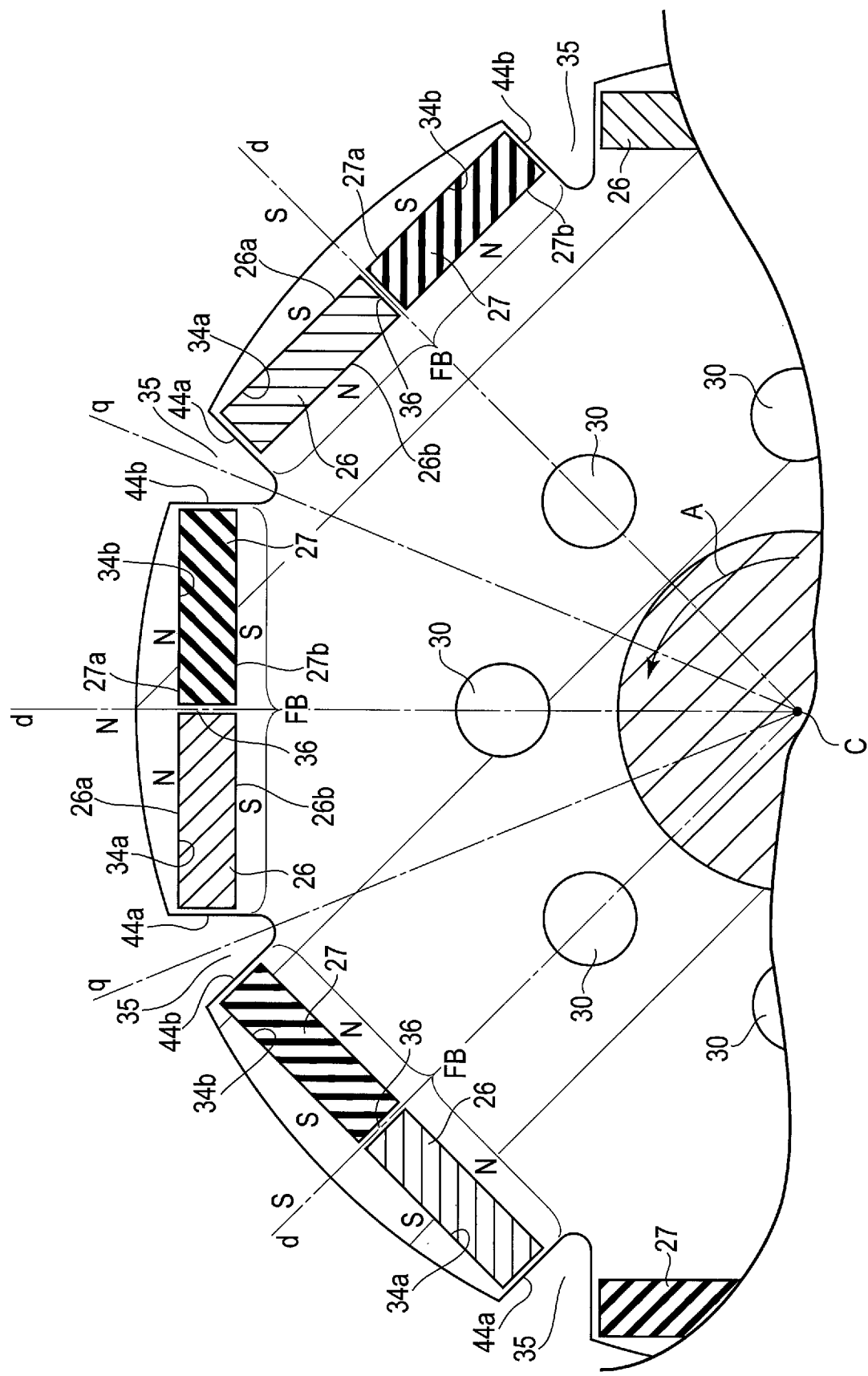
F I G. 2B

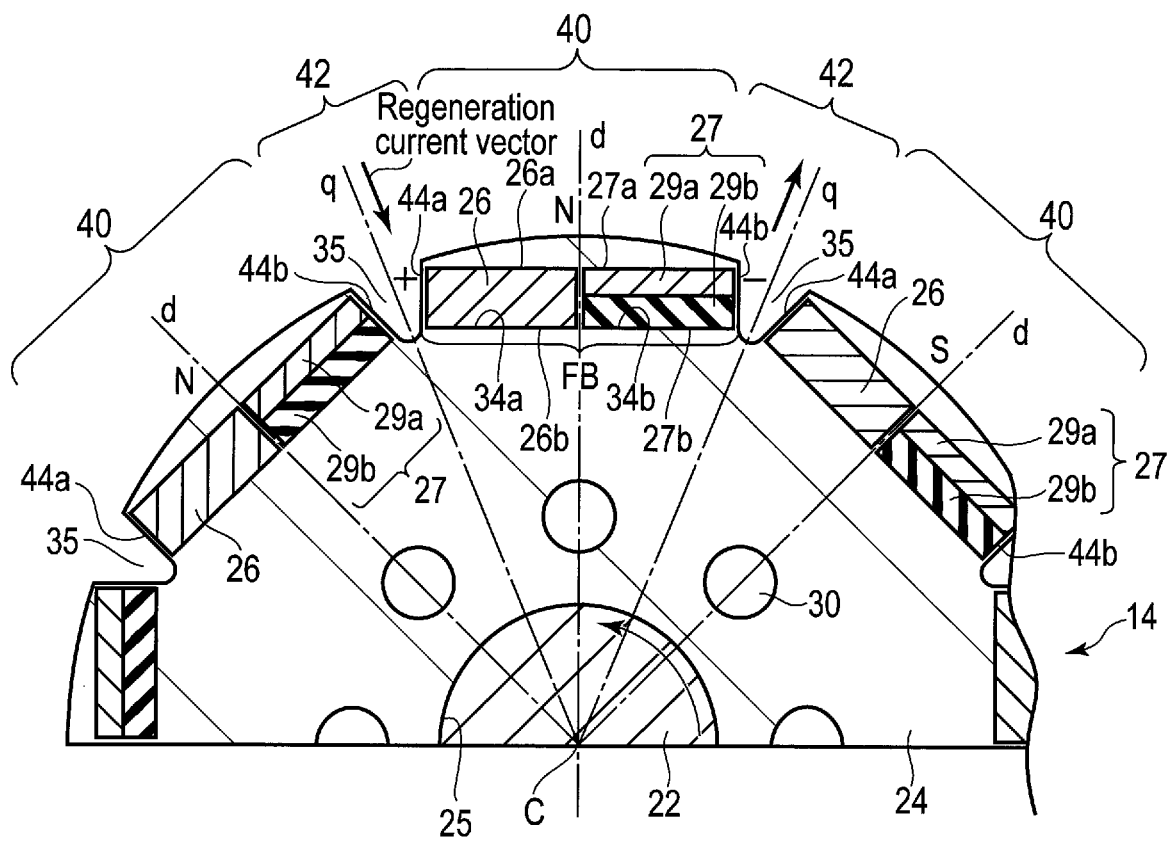
F I G. 4

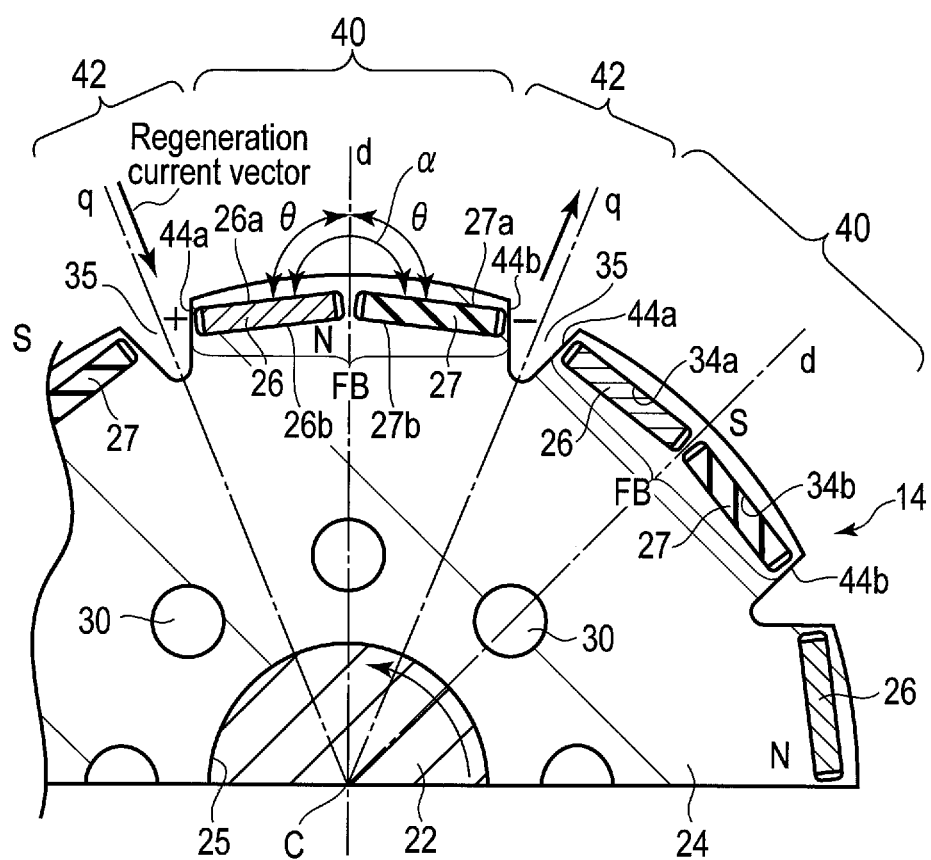
F I G. 5

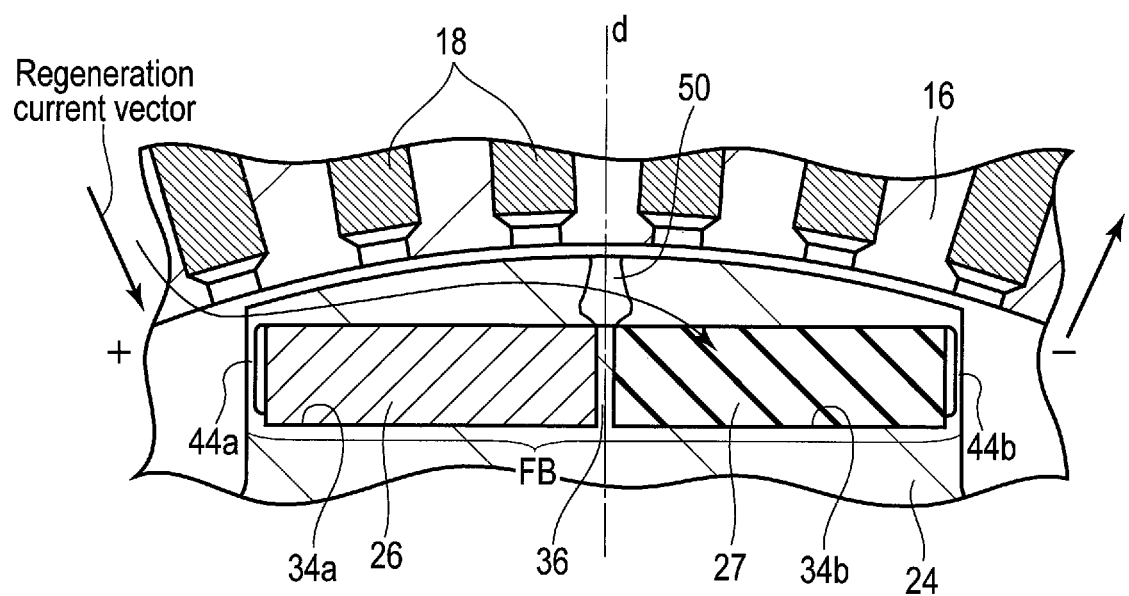
F I G. 8
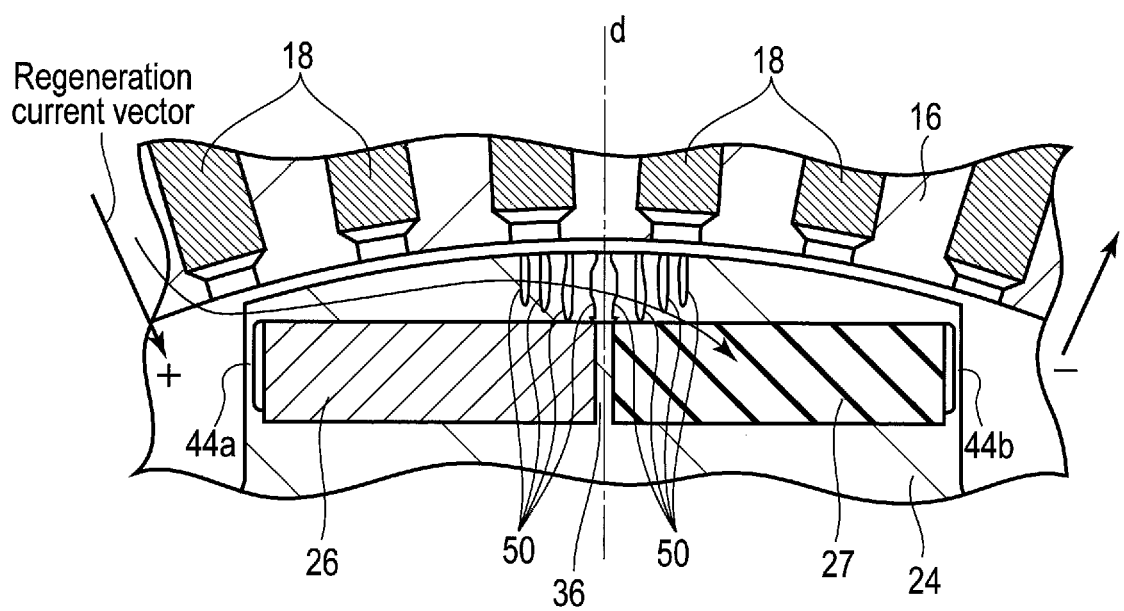
F I G. 9

ROTOR AND ROTARY ELECTRIC MACHINE

CROSS-REFERENCE TO RELATED APPLICATIONS

This application is a Continuation Application of PCT Application No. PCT/JP2018/033720, filed Sep. 11, 2018 and based upon and claiming the benefit of priority from Japanese Patent Application No. 2017-174264, filed Sep. 11, 2017, the entire contents of all of which are incorporated herein by reference.

FIELD

Embodiments described herein relate generally to a rotor of a rotary electric machine, and an electric rotating machine including the rotor.

BACKGROUND

In recent years, permanent magnets of high magnetic energy product have been developed thanks to keen research and development of this technical field. Using such permanent magnets, there are permanent magnet type rotary electric machines used as electric motors or electric generators of trains and automobiles. In general, a permanent magnet type rotary electric machine includes a cylindrical stator and a rotor rotatably supported in the stator. The rotor includes a rotor core and a plurality of permanent magnets embedded in the rotor core to form a plurality of magnetic poles.

Such a permanent magnet type rotary electric machine is suitable for a variable-speed drive rotary electric machine. Since interlinkage flux of a permanent magnet is produced constantly with a certain strength, an induced voltage (back electromotive voltage) by the permanent magnet becomes higher in proportion with a rotation speed in the permanent magnet type rotary electric machine. Thus, when a variable-speed drive from a low speed to a high speed is performed, the induced voltage by the permanent magnet becomes very high in the high speed rotation. When the induced voltage by the permanent magnet is applied to electronic components such as inverters and the like and exceeds an acceptable limit, the electronic components breakdown. Thus, the amount of influx of the permanent magnet may be designed to be below the limit, but in that case, an output and efficiency decrease in a low speed area of the rotary electric machine.

When a variable-speed drive is performed at almost constant output from a low speed to a high speed, the interlinkage flux of the permanent magnet is constant, and thus, the voltage of the rotary electric machine reaches a power voltage limit, and current required for output does not flow. As a result, the output significantly decreases in the high speed rotation area, and the variable-speed drive becomes difficult to reach a high speed rotation range.

Recently, as a method of expanding a variable-speed range, there is a proposed technique of adjusting entire amount of interlinkage flux by disposing a low coercive force permanent magnet (hereinafter will be referred to as a variable magnetic force magnet) by which a magnetic flux density changes irreversibly by a magnetic field formed by current of a stator winding and a high coercive force permanent magnet (hereinafter will be referred to as a fixed magnetic force magnet) which has twice or more a coercive force than that of the variable magnetic force magnet, and magnetizing the variable magnetic force magnet with a magnetic field by the current such that all interlinkage flux by the variable magnetic force and the fixed magnetic force magnet reduce in the high speed area where the power voltage exceeds the maximum limit.

As significant characteristics, a permanent magnet type rotary electric machine can change an amount of interlinkage flux between the maximum and zero and set a direction of magnetization to both forward and reverse with an axis d current of a rotor. On the other hand, great magnetization current is required in a case where the variable magnetic force magnet is increased in the magnetic force, and thus, a large-sized inverter to drive the machine is required.

Because of characteristics of the permanent magnet, great magnetization current is more required in a case of increasing the magnetic force than a case of demagnetizing the magnetic force. The rotary electric machine includes two types of magnets arranged magnetically in parallel, and thus, a great magnetic field is required to increase the magnetic force of the variable magnetic force magnet because of an influence of the interlinkage flux of the fixed magnetic force magnet.

Torque of the permanent magnet type rotary electric machine includes a permanent magnet torque component and a reluctance torque component. A current phase angle which makes the torque maximum differs in the magnet torque component and the reluctance torque component. With respect to a current phase of the magnet torque, a current phase of the reluctance torque has a double frequency and is a reverse phase. Thus, the total torque of the rotary electric machine becomes below a maximum total value of two torque components. That is, at the maximum torque point of the rotary electric machine, influx of the permanent magnet is not effectively used. If anything, at the maximum torque point of the rotary electric machine, the permanent magnet partially produce negative torque.

There are proposed rotary electric machines which can rotate in both forward and reverse directions; however, because of the above-mentioned points, a technique of rotating in both directions is difficult to achieve, and such machines have not been achieved.

BRIEF DESCRIPTION OF THE DRAWINGS

FIG. 1 is a cross-sectional view of a permanent magnet type rotary electric machine of a first embodiment.

FIG. 2A is a cross-sectional view of a rotor of the rotary electric machine, shown in an enlarged manner.

FIG. 2B is a cross-sectional view of a plurality of magnetic poles of the rotor, shown in an enlarged manner.

FIG. 4 is a cross-sectional view of a rotor of a permanent magnet type rotary electric machine of a second embodiment.

FIG. 5 is a cross-sectional view of a rotor of a permanent magnet type rotary electric machine of a third embodiment.

FIG. 8 is a cross-sectional view of a part of a stator and a part of a rotor of a permanent magnet type rotary electric machine of a fourth embodiment.

FIG. 9 is a cross-sectional view of a part of a stator and a part of a rotor of a permanent magnet type rotary electric machine of a second variation, shown in an enlarged manner.

DETAILED DESCRIPTION

Figure 3A:
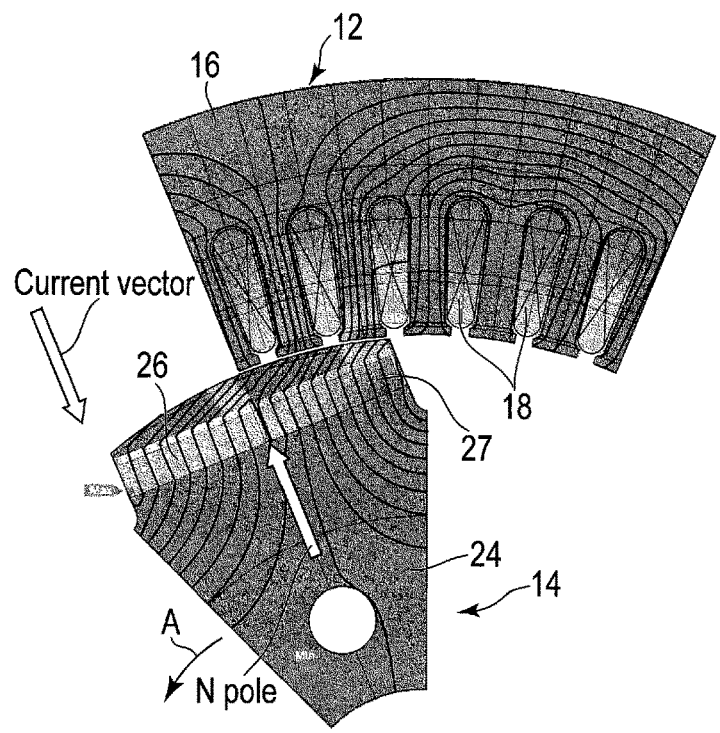
FIG. 3A is a cross-sectional view of a part of the stator and a part of the rotor of the rotary electric machine.

Various embodiments will be described hereinafter with reference to the accompanying drawings. In general, according to one embodiment, a rotor comprises a rotor core including a plurality of magnetic poles arranged in a circumferential direction around a central axis, where an axis extending radially through an end of the magnetic pole in the circumferential direction and the central axis is given axis q and an axis electrically apart from the axis q in the circumferential direction at 90 degrees is given axis d, a cavity formed on each axis q and extending toward the central axis, and a flux barrier band formed in the magnetic pole between a pair of the cavities adjacent to each other in the circumferential direction to cross the axis d and including a first bridge part facing one cavity, a second bridge part facing the other cavity, and a magnet embedding hole formed to be adjacent to the first and the second bridge parts; a first permanent magnet formed of a fixed magnetic force magnet in which a product of a coercive force and a magnetization direction thickness becomes great, the first permanent magnet being disposed in the magnet embedding hole to be adjacent to the first bridge part; and a second permanent magnet formed of a variable magnetic force magnet in which a product of a coercive force and a magnetization direction thickness is less than that of the first permanent magnet, the second permanent magnet being disposed in the magnet embedding hole to be adjacent to the second bridge part.

Note that elements common with different embodiments will be referred to by the same reference numbers, and explanation considered redundant will be omitted. Furthermore, each drawing is a schematic diagram for promoting the embodiments and their understanding, and the shapes, dimensions, ratios, etc., are different from those of an actual device, but their design can be changed as appropriate in consideration of the following descriptions and publicly known techniques.

First Embodiment

FIG. 1 is a cross-sectional view of a permanent magnet type rotary electric machine of a first embodiment. FIG. 2A is a cross-sectional view of a rotor of the rotary electric machine, and FIG. 2B is a cross-sectional view of a rotor where a plurality of magnetic poles are shown in an enlarged manner.

As in FIG. 1, a rotary electric machine 10 is, for example, structured as an inner rotor type rotary electric machine, and comprises an annular or cylindrical stator 12 which is supported by a fix frame (not shown), and a rotor 14 supported inside the stator 12 rotatably around a central axis C and coaxially with the stator 12. The rotary electric machine 10 is suitably applied to a generator or drive motor of a hybrid electric vehicle (HEV) and an electric vehicle (EV), for example.

The stator 12 comprises a cylindrical stator core 16 and an armature winding 18 wound around the stator core 16. The stator core 16 includes a number of annular electromagnetic steel plates of magnetic materials such as a silicon steel, laminated in a concentric manner. A plurality of slots 20 are formed in the inner peripheral part of the stator core 16. The slots 20 are arranged in a circumferential direction at regular intervals. Each slot 20 opens on the inner peripheral surface of the stator core 16, and extends radially from the inner peripheral surface. Furthermore, each slot 20 extends over the entire length of the stator core 16 in an axis direction. With the slots 20, the inner peripheral part of the stator core 16 forms many stator teeth 21 facing the rotor 14. The armature winding 18 is embedded in the slots 20 and is wound around the stator teeth 21.

As in FIGS. 1 and 2A, the rotor 14 comprises a rotation shaft 22 both ends of which are rotatably supported by bearings (not shown), cylindrical rotor core 24 fixed to approximately the center part of the rotation shaft 22, and permanent magnets 26 and 27 embedded in the rotor core 24. The rotor 14 is arranged inside and coaxially with the stator 12 with a slight gap therebetween. That is, the outer peripheral surface of the rotor 14 is opposed to the inner peripheral surface of the stator 12 with a slight gap (gap part) therebetween. The rotor core 24 includes an inner hole 25 formed coaxially with the central axis C. The rotation shaft 22 is inserted into and engaged with the inner hole 25, and extends coaxially with the rotor core 24.

The rotor core 24 is structured as a large number of annular electromagnetic steel plates of magnetic materials such as a silicon steel, laminated in a concentric manner. The rotor core 24 includes, for example, magnetic poles 40 of eight poles arranged in the circumferential direction. In the rotor core 24, an axis extending in a radial direction of the rotor core 24 or radially through a boundary field of adjacent magnetic poles (ends of magnetic poles in the circumferential direction) and the central axis C is given axis q, and an axis electrically apart from an axis q at 90 degrees is given axis d. In this example, an axis extending through the center of each magnetic pole 40 in the circumferential direction is given axis d (magnetic pole central axis), and an axis which is electrically and magnetically orthogonal to the axis d is given axis q. Axes d and q are alternately arranged in the circumferential direction of the rotor core 24 periodically. The rotary electric machine 10 of the present embodiment includes eight poles and includes eight axes d and eight axes whereas the rotary electric machine 10 may include different number of poles.

As in FIGS. 1 and 2A, a plurality of permanent magnets are provided at the rotor core 24. In the present embodiment, the permanent magnets are embedded in the rotor core 24 and disposed in the proximity of the outer peripheral surface of the rotor core 24. To conform to the number of poles, eight first permanent magnets 26 and eight second permanent magnets 27 are disposed. A first permanent magnet 26 and a second permanent magnet 27 are provided per magnetic pole of the rotor core 24.

As in FIGS. 2A and 2B, a plurality of cavities such as V-shaped cuts 35 are formed on the outer peripheral surface of the rotor core 24. Each cut 35 is formed on the axis q, and extends along the entire length in the axis direction of the rotor core 24. The cut 35 extends from the outer peripheral surface of the rotor core 24 toward the central axis C. In the present embodiment, each of the cuts 35 extends deeper to the central axis C side than is the position where the first permanent magnet 26 and the second permanent magnet 27 are disposed.

Each magnetic pole 40 of the rotor core 24 includes a flux barrier band FB formed between a pair of cuts 35 adjacent in the circumferential direction to cross the axis d. The flux barrier band FB includes a first bridge part 44a formed to face one cut 35, second bridge part 44b formed to face the other cut 35, and magnet embedding hole formed to be adjacent to the first bridge part 44a and the second bridge part 44b, that is, at least one magnet embedding hole extends between the first bridge part and the second bridge part. In the present embodiment, the flux barrier band FB includes a center bridge part (third bridge part) 36 formed on the axis d, and the magnet embedding hole includes a first magnet embedding hole 34a formed between the first bridge part 44a and the center bridge part 36 and a second magnet embedding hole 34b formed between the second bridge part 44b and the center bridge part 36.

In the circumferential direction of the rotor core 24, the first magnet embedding hole 34a and the second magnet embedding hole 34b are formed in both sides of each axis d. Each of the magnet embedding holes 34a and 34b extends in the axis direction of the rotor core 24. The first and second magnet embedding holes 34a and 34b have a substantially-rectangular cross-sectional shape, and extend in a direction substantially-orthogonal to the axis d. The first and second magnet embedding holes 34a and 34b are opposed to each other with a narrow magnetic path (center bridge part) 36 on the axis d interposed therebetween, and aligned linearly.

Furthermore, a plurality of cavity holes (through holes) 30 are formed in the rotor core 24. Each cavity hole 30 extends in the axis direction of the rotor core 24. The cavity holes 30 are disposed around the inner hole 25 and each positioned on the axis d. The cavity hole 30 has a circular cross-sectional shape, for example.

As in FIGS. 2A and 2B, the first permanent magnet 26 is disposed in the first magnet embedding hole 34a, and is positioned to be adjacent to the first bridge part 44a. The second permanent magnet 27 is disposed inside the second magnet embedding hole 34b, and is positioned to be adjacent to the second bridge part 33b. Thus, the first and second permanent magnets 26 and 27 are embedded in each magnetic pole 40 of the rotor core 24. The first permanent magnet 26 and the second permanent magnet 27 are formed in a slender plate-like shape and have a rectangular cross section and a length which is substantially equal to the axial length of the rotor core 24, for example. The first permanent magnet 26 includes a first slender rectangular side surface (surface) 26a and a second slender rectangular side surface (back surface) 26b which is substantially parallel to the first side surface 26a. The second permanent magnet 27 includes a first slender rectangular side surface (surface) 27a and a second slender rectangular side surface (back surface) 27b which is substantially parallel to the first side surface 27a. The first permanent magnet 26 and the second permanent magnet 27 may be structured as a combination of magnets divided in the axis direction (longitudinal direction), and in that case, a total length of the magnets is substantially equal to the axial length of the rotor core 24.

The first permanent magnet 26 and the second permanent magnet 27 are embedded in substantially the entire length of the rotor core 24. The first permanent magnet 26 and the second permanent magnet 27 are disposed in the first magnet embedding hole 24a and the second magnet embedding hole 34b, and are fixed to the rotor core 24 with an adhesive agent or the like. Thus, the first and second permanent magnets 26 and 27 are positioned in the first and second magnet embedding holes 34a and 34b. The first permanent magnet 26 and the second permanent magnet 27 are adjacent to each other with the bridge part 36 on the axis d interposed therebetween. The first and second permanent magnets 26 and 27 extend in a direction which is substantially orthogonal to the axis d and are aligned linearly.

The magnetization directions of the first permanent magnet 26 and the second permanent magnet 27 are to orthogonal to the surface (first side surface) and the back surface (second side surface) of the permanent magnets. The first permanent magnet 26 and the second permanent magnet 27 positioned in the both sides of each axis d are arranged such that the magnetization directions become the same. The second permanent magnet 27 and the first permanent magnet 26 positioned in the both sides of the axis q are arranged such that the magnetization directions become opposite to each other. With the permanent magnets 26 and 27 arranged as above, in an outer circumferential area, an area on each axis d forms one magnetic pole 40 at the center and an area on each axis q forms one inter-magnetic poles part 42 at the center. In the present embodiment, the rotary electric machine 10 is a permanent magnet type rotary electric machine having eight magnetic poles (four-pole to four-pole) where N poles and S poles are arranged alternately in the circumferential direction with 48 slots and windings wound in a single distributed winding manner.

The first and second permanent magnets 26 and 27 are two different types of permanent magnets having a different product of a coercive force and a magnetization direction thickness. For example, the first permanent magnet 26 is a permanent magnet by which a product of a coercive force and a magnetization direction thickness becomes great (hereinafter referred to as a fixed magnetic force magnet), and the second permanent magnet 27 is a permanent magnet by which a product of a coercive force and a magnetization direction thickness becomes small, that is, becomes less than that of the first permanent magnet 26 (hereinafter referred to as a variable magnetic force magnet).

The first permanent magnet (fixed magnetic force magnet) 26 is, for example, an NdFeB magnet or an SmCo magnet having a high coercive force. The second permanent magnet (variable magnetic force magnet) 27 is, for example, a ferrite magnet, AlNiCo magnet, or SmCo magnet having a small coercive force.

In the present embodiment, as a variable magnetic force magnet 27, for example, an SmCo magnet having a coercive force of approximately 150 to 400 kA/m is used. Furthermore, as a fixed magnetic force magnet 26, an NdFeB magnet having a coercive force of approximately 1500 kA/m is used. In the present embodiment, the fixed magnetic force magnet 26 and the variable magnetic force magnet 27 have substantially equal magnetization direction thicknesses, and thus, the fixed magnetic force magnet 26 has a product of a coercive force and a magnetization direction thickness which is greater than that of the variable magnetic force magnet 27 in the entire range of the maximum usable temperatures. The coercive force of the variable magnetic force magnet 27 is $\frac{1}{10}$ to $\frac{1}{4}$ of the fixed magnetic force magnet 26, which changes an amount of flux irreversibly by a magnetic field produced by the current flowing the armature winding 18.

As can be understood from the above, with the variable magnetic force magnet 27 of low coercive force, the magnetization state of the permanent magnet can be changed by an external magnetic field, and a variable speed drive can be performed in a wide range from a low speed to a high speed. Furthermore, with a fixed magnetic force magnet having a high coercive force as the first permanent magnet 26, a rotary electric machine of excellent performance can be achieved.

In the present embodiment, the rotary electric machine 10 is structured such that the rotor 14 rotates in a single direction.

As in FIG. 2A, the rotor 14 rotates in a direction of arrow A (counterclockwise) where the direction of arrow is a downstream side DS of the rotation direction A and the opposite direction of the arrow is an upstream side US of the rotation direction A per magnetic pole 40. In one magnetic pole, the first permanent magnet (fixed magnetic force magnet) 26 is, with respect to the axis d, disposed in the downstream side (one end side of the magnetic pole 40) DS of the rotation direction A, and the second permanent magnet (variable magnetic force magnet) 27 is, with respect to the axis d, disposed in the upstream side (the other end side of the magnetic pole 40) US of the rotation direction A. In the present embodiment, the first and second permanent magnets 26 and 27 are magnetized in a direction parallel to the axis d. Furthermore, the first and second permanent magnets 26 and 27 are magnetized such that the magnetization directions are opposite to each other between adjacent magnetic poles 40.

Thus, with respect to the magnetic pole direction (axis d direction) which is a direction of total magnet flux from the central axis C of the rotor 14, two or more types of first and second permanent magnets 26 and 27 are arranged asymmetrically. That is, the first and second permanent magnets 26 and 27 are arranged such that products of the coercive force and the magnetization direction thickness become asymmetrically with respect to the axis d. If a gap between the outer peripheral surface of the rotor core 24 and the inner peripheral surface of the stator core 16 is given a gap part, the first permanent magnet (fixed magnetic force magnet) 26 having a high coercive force is disposed in a position close to a gap part where a current vector generating torque and a magnetic field are opposed to each other (position of arrow +), and the second permanent magnet (variable magnetic force magnet) 27 having a low coercive force is disposed in a position close to a gap part where a current vector and a magnetic field are not opposed to each other (position of arrow −).

The rotary electric machine 10 structured as above will operate and work as follows.

In the present embodiment, a pulse-like current having a short on-time (approximately 0.1 to 100 ms) is supplied to the armature winding 18 of the stator 12 to form a field which magnetizes the variable magnetic force magnet 27. The pulse current (magnetization current) forming a field to magnetize the variable magnetic force magnet 27 is an axis d current component of the armature winding 18 of the stator 12.

When the fixed magnetic force magnet 26 and the variable magnetic force magnet 27 have a substantially same thickness, the magnetization state of the permanent magnet caused by a magnetic field of the axis d current changes depending on the size of the coercive force. That is, a change in the magnetization state of the permanent magnet caused by the magnetic field can be roughly derived by calculating a product of a size of a coercive force and a thickness of the permanent magnet. In the present embodiment, the coercive force of the variable magnetic force magnet (SmCo magnet) 27 is 400 kA/m, and the coercive force of the fixed magnetic force magnet (NdFeB magnet) 26 is 1500 kA/m. Furthermore, the thickness of the first and second permanent magnets 26 and 27 in the magnetization direction are both 5 mm. A magnetomotive force required for the magnetization is roughly derived by calculating a product of a field required for the magnetization and a thickness of the permanent magnet. If 90% of the magnetization field of the SmCo magnet (variable magnetic force magnet) is approximately 800 kA/m, the magnetomotive force required for the magnetization is 800 kA/m×5×0.001=4000 A. On the other hand, if 90% of the magnetization field of the NdFeB magnet (fixed magnetic force magnet) is approximately 3000 kA/m, the magnetomotive force required for the magnetization is 3000 kA/m×5×0.001=15000 A.

The magnetomotive force required for varying the magnetic force of the SmCo magnet as the variable magnetic force magnet 27 is approximately 27% of the magnetomotive force required for varying the NdFeB magnet as the fixed magnetic force magnet 26. Thus, with the current which can vary the magnetic force of the SmCo magnet, the magnetic force of the NdFeB magnet is maintained as is. In the structure where two types of permanent magnets are arranged in parallel, the magnetic force of the NdFeB magnet is maintained as a base part while the magnetic force of the SmCo magnet is changed, the entire amount of interlinkage flux of the permanent magnets can be adjusted.

Initially, a negative axis d current (magnetization current) which produces a field of opposite direction to the magnetization direction of the magnet is supplied to the armature winding 18 in a pulse-like manner. If the field in the magnet which is changed by the negative axis d current becomes 400 kA/m or more, the magnetic force of the variable magnetic force magnet 27 significantly decreases irreversibly since the coercive force thereof is 400 kA/m. On the other hand, the magnetic force of the fixed magnetic force magnet 26 does not decrease irreversibly since the coercive force thereof is 1500 kA/m. As a result, if the axis d current in a pulse manner becomes zero, only the magnetization of the variable magnetic force magnet 27 is demagnetized, and the amount of interlinkage flux of the entire magnetic poles 40 can be decreased. Therefore, a loss in a no load drive (regeneration) and a core loss can be suppressed.

Then, a positive axis d current which produces a field of same direction to the magnetization direction of the first and second permanent magnets 26 and 27 is supplied to the armature winding 18. A field required to magnetize the variable magnetic force magnet (SmCo magnet) 27 is generated. If the field in the variable magnetic force magnet 27 which is changed by the positive axis d current (magnetization current) is 600 kA/m, the demagnetized variable magnetic force magnet 27 is magnetized, and produces maximum magnetization. On the other hand, the coercive force of the fixed magnetic force magnet (NdFeB magnet) is 1500 kA/m which does not change irreversibly. As a result, when the positive axis d current supplied in a pulse manner becomes zero, only the variable magnetic force magnet 27 is magnetized, and the amount of interlinkage flux by the permanent magnets 26 and 27 of the whole magnetic poles 40 can be increased. Thus, the maximum interlinkage flux is restored as is originally. Thus, a loss in a load drive (power running) and an output loss can be suppressed.

As above, instant magnetic fields of the axis d current applied to the second permanent magnet (variable magnetic force magnet) 27 and the first permanent magnet (fixed magnetic force magnet) 26 to irreversibly change the magnetic force of the variable magnetic force magnet 27, and thus, the entire amount of interlinkage flux of the whole magnetic poles 40 can be changed optionally.

In that case, in the generation of the maximum torque of the rotary electric machine 10, the variable magnetic force magnet 27 is magnetized such that the flux from the first and second permanent magnets 26 and 27 of the magnetic pole 40 are combined, and in a light load time with a small torque, or in a medium speed rotation area and a high speed rotation area, the flux is decreased by the magnetization of the variable magnetic force magnet 27 with a field by the current. Furthermore, when the rotor 14 is at the maximum rotation speed while the second permanent magnet 27 of the magnetic pole 40 is irreversibly changed and the amount of the interlinkage flux is minimized, an induced electromotive voltage by the first and second permanent magnets 26 and 27 becomes below a withstand voltage of electronic components of an inverter which is a power source of the rotary electric machine 10.

Figure 3B:
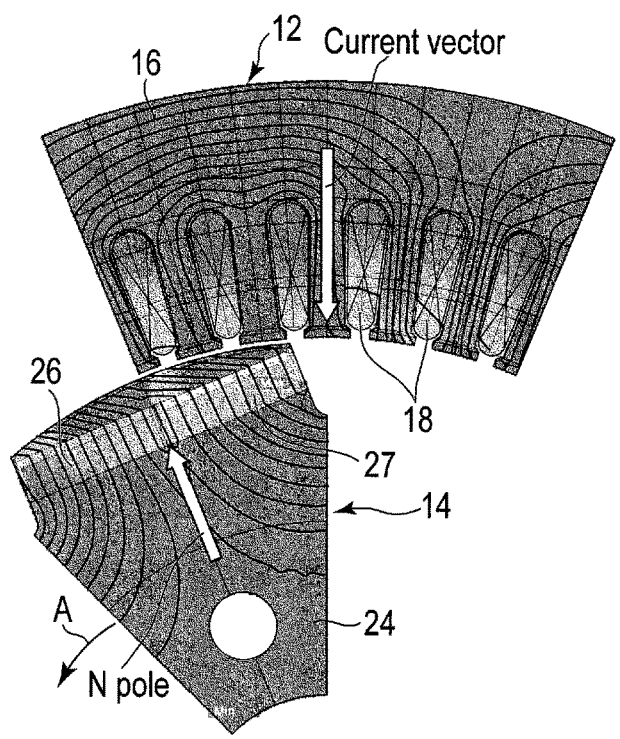
FIG. 3B is a cross-sectional view of a part of the stator and a part of the rotor of the rotary electric machine.

FIGS. 3A and 3B are cross-sectional views of a part of the stator and a part of the rotor. As in FIG. 3A, during the regeneration drive of the rotary electric machine 10, a current vector is input in a phase electrically forward by 90 degrees from the magnetic pole center of the magnetic pole 40. As in FIG. 3B, during the normal drive (power running) of the rotary electric machine 10, a current vector is input in a phase electrically delayed by 90 degrees from the magnetic pole center of the magnetic pole 40. Thus, between the regeneration and the power running, positions of reverse magnetic fields working on the first permanent magnet 26 and the second permanent magnet 27 differ. As in FIG. 3A, during the regeneration drive, with respect to the axis d, a great reverse magnetic field works on the downstream side (left side) of the rotation direction A and the reverse magnetic field working on the upstream side (right side) of the rotation direction A becomes small. Thus, with the fixed magnetic force magnet 26 which is greatly resistive to the reverse magnetic field disposed at least in the downstream side, an effect of the reverse magnetic field can be canceled. Furthermore, with the variable magnetic force magnet 27 which is less resistive to the reverse magnetic field disposed in the upstream side (right side), a variable flux memory motor can be achieved. That is, since the reverse magnetic field working on the variable magnetic force magnet 27 is small, demagnetization or reverse magnetization of the variable magnetic force magnet 27 can be easily performed with small magnetization current.

Figure 13:
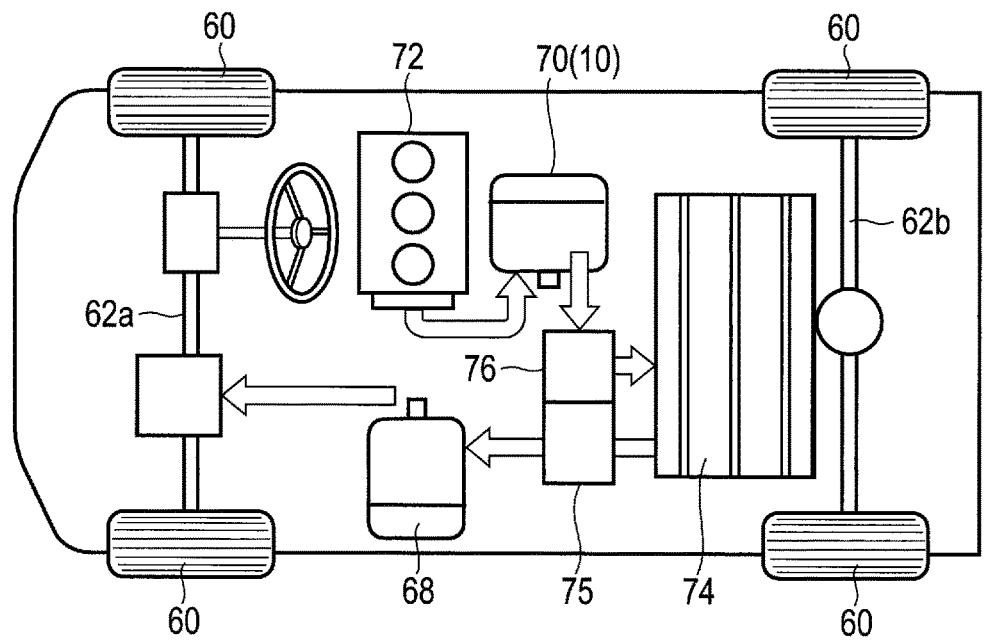
FIG. 13 is a block diagram illustrating an example where the permanent magnet type rotary electric machine of the present embodiment applied to a generator of a hybrid electric vehicle.

FIG. 13 is a schematic view of a hybrid electric vehicle including the rotary electric machine 10. The hybrid electric vehicle comprises, for example, four wheels 60 and a chassis 64 supporting wheels 60 through shafts 62a and 62b. On the chassis 64, for example, a drive motor 68 which drives the shaft 62a of the front wheels, generator 70 to which the rotary electric machine 10 of the present embodiment is applied, engine 72 as an internal combustion mechanism to drive the generator 70, high voltage battery 74 which is a lithium secondary battery storing the power generated by the generator 70, inverter 75 which converts the direct current supplied from the high voltage battery 74 to an alternating current to drive the drive motor 68, and control device 76 are disposed.

During the normal drive (EV mode), the hybrid electric vehicle drives the drive motor 68 with the power supplied from the high voltage battery 74. The drive torque of the drive motor 68 is transmitted to the wheels 60 through the shaft 62a, and the vehicle runs. If the charge of the high voltage battery 74 decreases, the engine 72 is driven, and the generator 70 is driven by the output from the engine 72 (HEV mode). The power from the generator 70 is stored in the high voltage battery 74. In that case, the rotor 14 of the generator 70 is driven by the output from the engine 72, and electromotive power is produced in the armature winding 18.

As above, during the EV mode, the generator 70 outputs zero power, and the rotor 14 is rotated in accordance with the drive of the motor. At that time, the magnetization of the variable magnetic force magnet 27 is decreased to suppress a loss and a core loss, and a low loss drive can be achieved. Furthermore, during the HEV mode, the generator 70 is mainly driven in the regeneration state. At that time, the variable magnetic force magnet 27 is magnetized more to increase the amount of flux of the magnetic poles 40, and thus, a loss can be suppressed, and power generation can be increased.

As described above, according to the first embodiment, two or more types of permanent magnets having different products of a coercive force and a magnetization direction thickness are arranged such that products of the coercive force and the magnetization direction thickness become asymmetric with respect to the magnetic pole center axis, and thus, a permanent magnet type rotary electric machine which can performed a variable-speed drive in a wide range from a low speed to a high speed, and can suppress a loss and improve efficiency can be achieved.

Now, other embodiments and variations of the rotary electric machine will be explained. In the following explanation of other embodiments and variations, elements which are the same as those of the first embodiment will be referred to by the same reference numbers, and description thereof will be omitted or simplified in order to focus on differences from the first embodiment.

Second Embodiment

FIG. 4 is a cross-sectional view of a part of a rotor of a rotary electric machine of a second embodiment.

According to the second embodiment, the second permanent magnet 27 includes two types of magnets having different products of a coercive force and a magnetization direction thickness. For example, the second permanent magnet 27 is a combination of a fixed magnetic force magnet 29a having a greater product of the coercive force and he magnetization direction thickness and a variable magnetic force magnet 29b having a small product of the coercive force and the thickness. The fixed magnetic force magnet 29a and the variable magnetic force magnet 29b are formed to have the same length and the same width. The fixed magnetic force magnet 29a and the variable magnetic force magnet 29b may be formed to have the same thickness or different thicknesses.

The fixed magnetic force magnet 29a and the variable magnetic force magnet 29b are embedded in the common magnet embedding hole 34b while are layered in a radial direction of the rotor core 24. The fixed magnetic force magnet 29a is disposed in the outer peripheral side and the variable magnetic force magnet 29b is disposed in the inner peripheral side. That is, if a gap between the outer peripheral surface of the rotor core 24 and the inner peripheral surface of the stator core is given a gap part, the fixed magnetic force magnet 29a is disposed close to the gap part (close to the outer peripheral surface of the rotor core 24), and the variable magnetic force magnet 29b is disposed to be apart from the gap part.

In general, a reverse magnetic field working on a permanent magnet increases in the outer peripheral side of the rotor 14 (gap part side) as compared to the inner peripheral side. As described above, the second permanent magnet 27 is more resistive to the reverse magnetic field with the fixed magnetic force magnet 29a disposed of greater coercive force in the outer peripheral side. Furthermore, with the variable magnetic force magnet 29b disposed in the inner peripheral side, a great reverse magnetic field does not work on the variable magnetic force magnet 29b even if a great regeneration current vector is applied to the rotor 14. Thus, a variable magnetic force magnet of lesser coercive force can be used, and demagnetization or reverse magnetization of the variable magnetic force magnet 29b can be achieved by much smaller magnetization current.

Note that the first permanent magnet 26 and the second permanent magnet 27 may have different thicknesses. In the second embodiment, the other structure of the rotary electric machine 10 is the same as that of the first embodiment.

According to the second embodiment, a permanent magnet type rotary electric machine which can performed a variable-speed drive in a wide range from a low speed to a high speed, and can suppress a loss and improve efficiency can be achieved.

Third Embodiment

Figure 6:
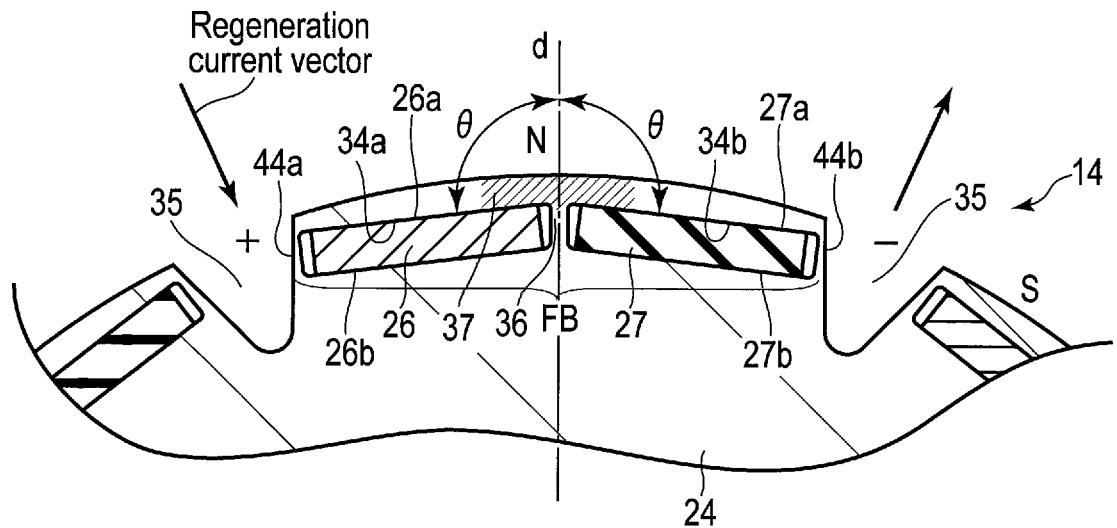
FIG. 6 is a cross-sectional view of a part of the rotor of the third embodiment, shown in an enlarged manner.

FIG. 5 is a cross-sectional view of a part of a rotor of a rotary electric machine of a third embodiment, and FIG. 6 is a cross-sectional view of the rotor where one magnetic pole is shown in an enlarged manner.

In the first embodiment, the first permanent magnet 26 and the second permanent magnet 27 are disposed to be orthogonal to the magnetic pole center axis (d axis) (magnetic pole angle of 90 degrees). On the other hand, in the third embodiment, at least one of the first and second permanent magnets 26 and 27 is disposed such that an angle formed by a direction of total magnet flux (magnetic pole central axis, axis d) and a first side surface 26a or 27a (magnetic pole angle θ) becomes 90 or more degrees. In the present embodiment, both the first and second permanent magnets 26 and 27 are disposed at a magnetic pole angle θ of greater than 90 degrees. Thus, an arrangement angle α between the first and second permanent magnets 26 and 27 is greater than 180 degrees.

The end of the first permanent magnet 26 in the axis d side and the end of the second permanent magnet 27 in the axis d side are positioned to be close to the outer peripheral surface of the rotor core 24. Between the ends and the outer peripheral surface of the rotor core 24, a narrow inter-magnets path part (bridge part) 37 is formed.

With at least one of the first and second permanent magnets 26 and 27 disposed at a magnetic pole angle θ which is greater than 90 degrees, the permanent magnet can be disposed close to the outer peripheral surface of the rotor core 24, and magnet torque can be increased as with a surface magnet type. With an inter-magnets path part 37 formed between the second permanent magnet 27 and the first permanent magnet 26, a reverse magnetic field by the regeneration current vector becomes difficult to flow, and an amount of reverse magnetic field working on the second permanent magnet (variable magnetic force magnet) 27 can be reduced. Thus, a variable magnetic force magnet of small coercive force can be used, and the variable magnetic force magnet 27 can be demagnetized or reverse-magnetized with small magnetization current. Furthermore, with the above-described arrangement, the thickness of the first permanent magnet and the second permanent magnet can be increased.

In the third embodiment, the other structure of the rotary electric machine 10 is the same as that of the first embodiment. According to the third embodiment, a permanent magnet type rotary electric machine which can performed a variable-speed drive in a wide range from a low speed to a high speed, and can suppress a loss and improve efficiency can be achieved.

(First Modification)

Figure 7:
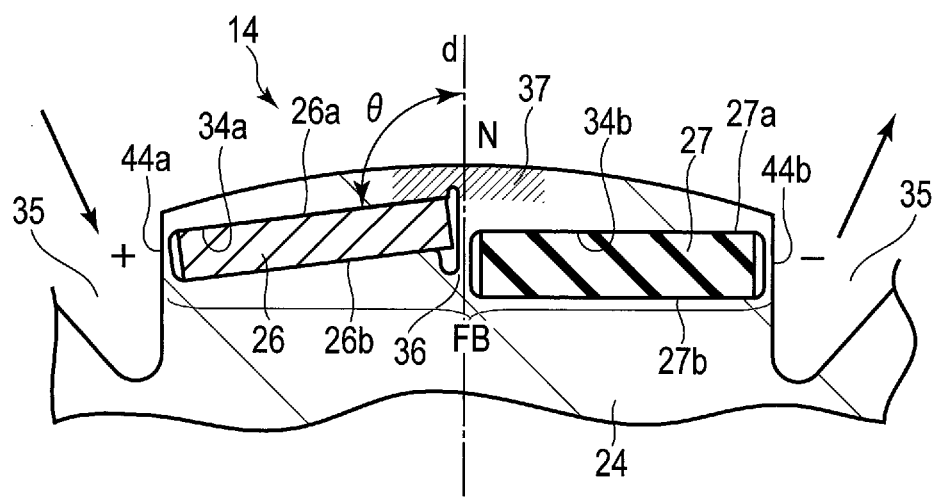
FIG. 7 is a cross-sectional view of a part of a rotor of a first variation, shown in an enlarged manner.

FIG. 7 is a cross-sectional view of a part of a rotor of a first variation of the third embodiment. In this first variation, only the first permanent magnet 26 is arranged with a magnetic pole angle θ which is greater than 90 degrees. The second permanent magnet 27 is arranged with a magnetic pole angle of 90 degrees. In that case, the end of the first permanent magnet 26 in the axis d side is positioned in the proximity of the outer peripheral surface of the rotor core 24, and the inter-magnets path part 37 is formed between the end and the outer peripheral surface.

In the first variation, improvement of magnet torque, and reduction of the reverse magnetic field working on the second permanent magnet (variable magnetic force magnet) 27.

Fourth Embodiment

FIG. 8 is a cross-sectional view of one magnetic pole of a rotary electric machine of a fourth embodiment, shown in an enlarged manner.

As described above, a filed produced by the regeneration current vector works on the variable magnetic force magnet 27 as a reverse magnetic field. Thus, in the present embodiment, in the rotor core 24, a one or more cavities functioning as a flux barrier preventing a flow of flux are provided at a magnetic path formed between the first and second permanent magnets 26 and 27 and the outer peripheral surface of the rotor core 24.

As in FIG. 8, according to the fourth embodiment, a cavity 50 positioned on the magnetic pole center axis (axis d) is formed between the first permanent magnet 26 and the second permanent magnet 27. The cavity 50 extends from the outer peripheral surface of the rotor core 24 to the bridge part 36 between the first permanent magnet 26 and the second permanent magnet 27, and almost completely cuts the magnetic path between the permanent magnets. With the cavity 50, a flow of the reverse magnetic field caused by the regeneration current vector can be prevented, and the amount of the reverse magnetic field working on the second permanent magnet (variable magnetic force magnet) 27 can be significantly decreased. Thus, a variable magnetic force magnet of smaller coercive force can be used, and the variable magnetic force magnet 27 can be demagnetized or reverse-magnetized with smaller magnetization current.

Note that the cavity 50 need not completely cut the magnetic path, and may be formed to narrow the magnetic path such that the reverse magnetic field does not easily flow between the permanent magnets.

(Second Modification)

FIG. 9 is a cross-sectional view of one magnetic pole of a rotary electric machine of a second variation, shown in an enlarged manner.

In the second variation, in the rotor core 24, there are a plurality of cavities 50 functioning as a flux barrier in the magnetic path formed between the first and second permanent magnets 26 and 27 and the outer peripheral surface of the rotor core 24. The cavities 50 are disposed on the axis d or in both sides of the axis d several with each. Each cavity 50 may be opening in the outer peripheral surface of the rotor core 24, or may not be opening therein. The cavities 50 may be disposed symmetrically or asymmetrically with respect to the axis d.

(Third Modification)

Figure 10:
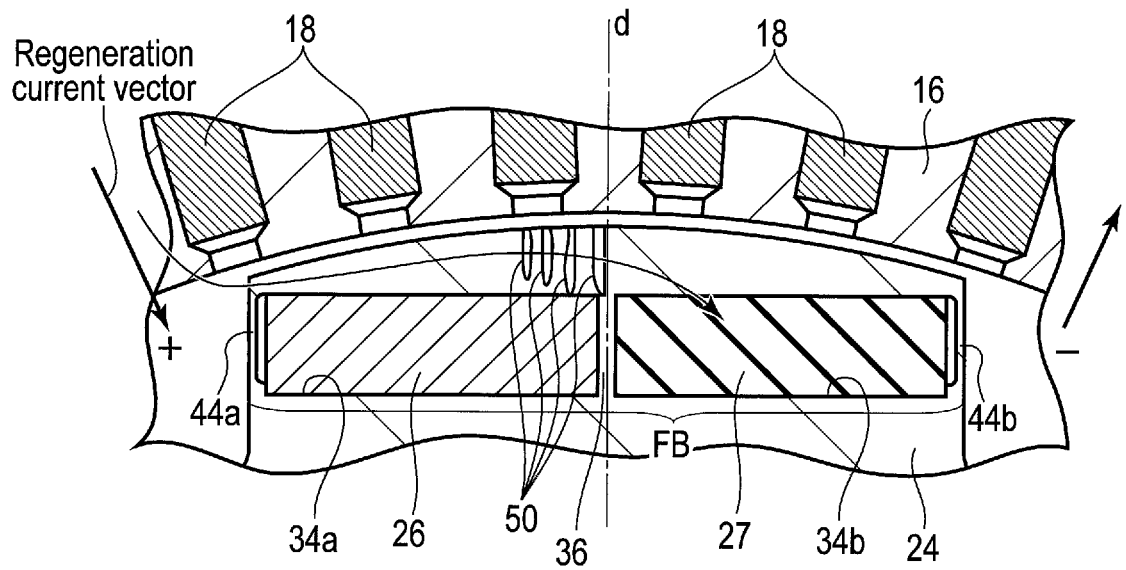
FIG. 10 is a cross-sectional view of a part of a stator and a part of a rotator of a permanent magnet type rotary electric machine of a third variation, shown in an enlarged manner.

FIG. 10 is a cross-sectional view of one magnetic pole of a rotary electric machine of a third variation, shown in an enlarged manner.

In the third variation, the cavities 50 functioning as a flux barrier are provided with only one side of the axis d. In this example, the cavities 50 are aligned from the axis d to the first permanent magnet 26 side in the magnetic path of the rotor core 24. Or, the cavities 50 may be aligned from the axis d to the second permanent magnet 27 side.

In both the second variation and the third variation, the cavities 50 can prevent the flow of reverse magnetic field caused by the regeneration current vector, and can significantly reduce the amount of reverse magnetic field working on the second permanent magnet (variable magnetic force magnet) 27.

Fifth Embodiment

Figure 11:
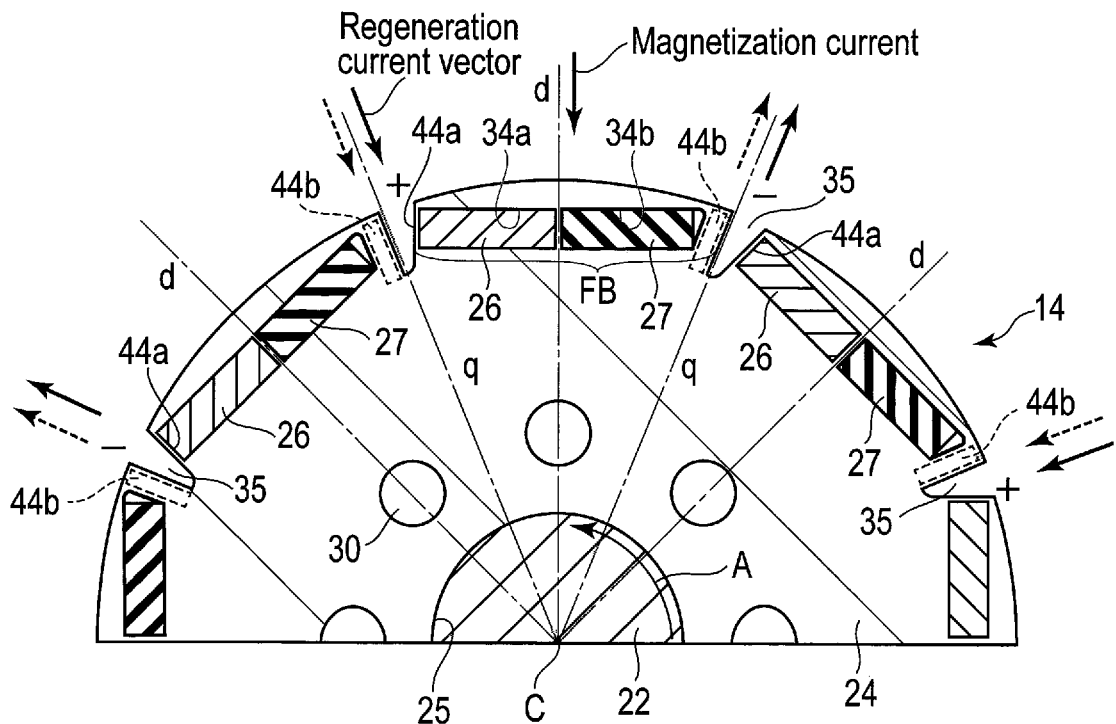
FIG. 11 is a cross-sectional view of a rotor of a permanent magnet type rotary electric machine of a fifth embodiment.

FIG. 11 is a cross-sectional view of a part of a rotor of a rotary electric machine of a fifth embodiment.

In the fifth embodiment, in the rotor core 24, the number of core magnetic paths in the proximity of the axis q is increased to produce reluctance torque asymmetrically. As in FIG. 11, the core magnetic paths are increased asymmetrically with respect to the axis d. In this example, the core magnetic paths are increased only in the second permanent magnet 27 side. In the circumferential part of the rotor core 24, additional core parts 44 are disposed in the downstream side of each axis q in the rotation direction A, that is, in the second permanent magnet (variable magnetic force magnet) 27 side. The rotor core 24 includes, in each magnetic pole 40, a flux barrier band including a first bridge part 44a positioned in one end side of the first permanent magnet 26 facing a cut (cavity) 35, and a second bridge part 44b positioned in the other end side of the second permanent magnet 27 facing another cut 35. The second bridge part 44b is formed wider than the first bridge part 44a. In other words, an area of almost half of each cut 35 formed on the axis q in the circumferential part of the rotor core 24 is filled with a core to be an additional core part (second bridge part) 44b. Thus, each cut 35 is formed only between the axis q and the first bridge part 44a.

Figure 12:
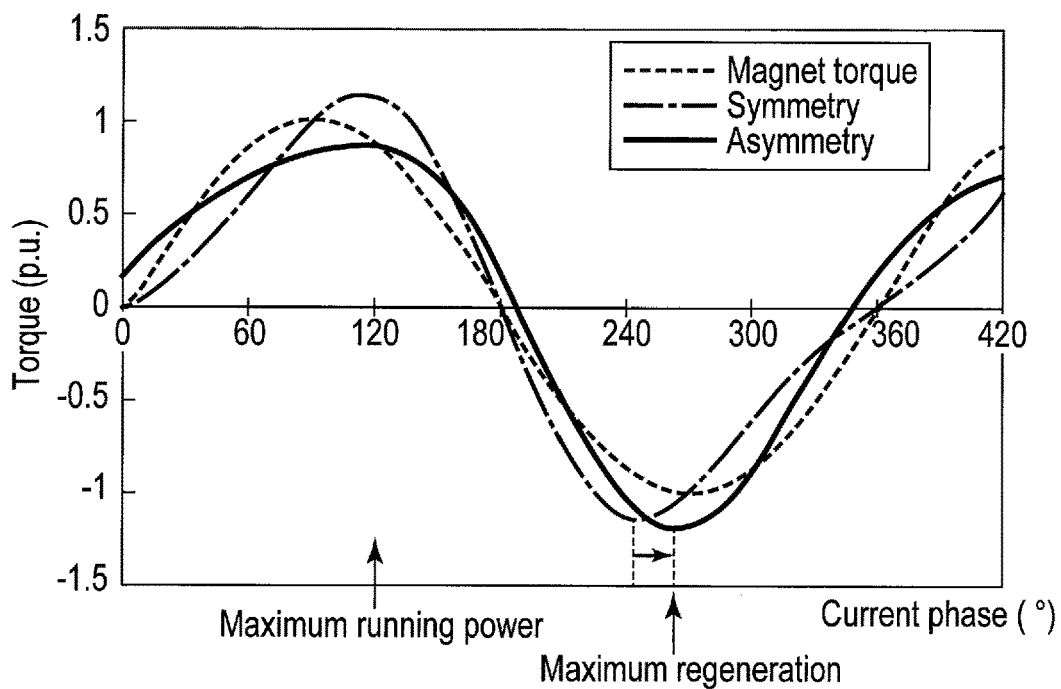
FIG. 12 a diagram illustrating a relationship between torque and current phase.

FIG. 12 illustrates a relationship between magnet torque, reluctance torque, and current phase. In FIG. 12, a dotted line indicates the magnet torque, and a solid line indicates reluctance torque of the rotor with core magnetic paths increased asymmetrically with respect to the axis d of the present embodiment, and furthermore, a single-dot broken line indicates reluctance torque of a rotor with core magnetic paths increased symmetrically with respect to the axis d as a comparative example.

As indicated by the single-dot broken line in FIG. 12, if the core magnetic paths are increased symmetrically with respect to the axis d, the current phases where each of the magnet torque and the reluctance torque becomes the maximum are shifted from each other electrically by 45 degrees. In contrast, as in the present embodiment, if the core magnetic paths are increased only in the second permanent magnet 27 side in an asymmetrical manner, as indicated by the solid line, a difference between the current phase where the magnet torque becomes the maximum and the current phase where the reluctance torque becomes the maximum can be suppressed. Specifically, a different of the current phase where the lower regeneration torque becomes the maximum can be suppressed (below 45 degrees). Thus, the total torque of the magnet torque and the reluctance torque during the regeneration is increased.

According to the fifth embodiment, with the core magnetic paths increased asymmetrically with respect to the axis d, the maximum torque during the regeneration can be increased. At the same time, with the additional core parts (second bridge parts) 44b, the amount of the reverse magnetic field produced by the regeneration current vector can be decreased. Thus, the amount of the reverse magnetic field working on the second permanent magnet (variable magnetic force magnet) 27 can be decreased. As can be understood from the above, a permanent magnet type rotary electric machine which can performed a variable-speed drive in a wide range from a low speed to a high speed, and can suppress a loss and improve efficiency can be achieved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the number of magnetic poles, size, and shape of the rotor are not limited to the examples of the embodiments, and may be changed depending on the design. The permanent magnet is not limited to the example of the embodiment, and can be changed optionally. Two or more types of permanent magnets having different products of a coercive force and a thickness are applicable to the embodiments, and not only the first and second permanent magnets but also three or more types of permanent magnets can be used. The rotor is not limited to a type in which the permanent magnets are embedded, and may be a surface-magnets type which includes permanent magnets on the outer peripheral surface of the rotor core.

What is claimed is:

1. A rotor comprising:
a rotor core including a plurality of magnetic poles arranged in a circumferential direction around a central axis, where an axis extending radially through an end of the magnetic pole in the circumferential direction and the central axis is given axis q and an axis electrically apart from the axis q in the circumferential direction at 90 degrees is given axis d, a cavity formed on each axis q and extending toward the central axis, and a flux barrier band formed in the magnetic pole between a pair of the cavities adjacent to each other in the circumferential direction to cross the axis d and including a first bridge part facing one cavity, a second bridge part facing the other cavity, and a magnet embedding hole formed to be adjacent to the first and the second bridge parts;
a first permanent magnet formed of a fixed magnetic force magnet in which a product of a coercive force and a magnetization direction thickness becomes great, the first permanent magnet being disposed in the magnet embedding hole to be adjacent to the first bridge part; and
a second permanent magnet formed of a variable magnetic force magnet in which a product of a coercive force and a magnetization direction thickness is less than that of the first permanent magnet, the second permanent magnet being disposed in the magnet embedding hole to be adjacent to the second bridge part, wherein the second permanent magnet is formed of two stacked magnets having different product of a coercive force and a magnetization direction thickness, where the magnet having a greater product of the coercive force and the magnetization direction thickness is positioned in an outer peripheral side of the rotor core.

2. The rotor of claim 1, wherein the first permanent magnet is disposed between the first bridge part and the axis d, and the second permanent magnet is disposed between the second bridge and the axis d.

3. The rotor of claim 2, wherein each of the cavities extends deeper to the central axis side than is the position where the first permanent magnet and the second permanent magnet are disposed.

4. The rotor of claim 1, wherein each of the first permanent magnet and the second permanent magnet includes a first side surface facing an outer peripheral direction of the rotor core, and at least one of the first permanent magnet and the second permanent magnet is disposed such that an angle formed of the axis d and the first side surface is equal to or greater than 90 degrees.

5. The rotor of claim 1, wherein each of the cavities extends deeper to the central axis side than is the position where the first permanent magnet and the second permanent magnet are disposed.

6. A rotary electric machine comprising:
a stator including a stator core and an armature winding; and
the rotor of claim 1.

7. A rotor comprising:
a rotor core including a plurality of magnetic poles arranged in a circumferential direction around a central axis, where an axis extending radially through an end of the magnetic pole in the circumferential direction and the central axis is given axis q and an axis electrically apart from the axis q in the circumferential direction at 90 degrees is given axis d, a cavity formed on each axis q and extending toward the central axis, and a flux barrier band formed in the magnetic pole between a pair of the cavities adjacent to each other in the circumferential direction to cross the axis d and including a first bridge part facing one cavity, a second bridge part facing the other cavity, and a magnet embedding hole formed to be adjacent to the first and the second bridge parts;
a first permanent magnet formed of a fixed magnetic force magnet in which a product of a coercive force and a magnetization direction thickness becomes great, the first permanent magnet being disposed in the magnet embedding hole to be adjacent to the first bridge part; and a second permanent magnet formed of a variable magnetic force magnet in which a product of a coercive force and a magnetization direction thickness is less than that of the first permanent magnet, the second permanent magnet being disposed in the magnet embedding hole to be adjacent to the second bridge part;

wherein each magnetic pole of the rotor core includes a magnetic path formed between the first and second permanent magnets and the outer peripheral surface of the rotor core, and a cavity extending from the outer peripheral surface to the first and second permanent magnets in the magnetic path.

8. A rotor comprising:
a rotor core including a plurality of magnetic poles arranged in a circumferential direction around a central axis, where an axis extending radially through an end of the magnetic pole in the circumferential direction and the central axis is given axis q and an axis electrically apart from the axis q in the circumferential direction at 90 degrees is given axis d, a cavity formed on each axis q and extending toward the central axis, and a flux barrier band formed in the magnetic pole between a pair of the cavities adjacent to each other in the circumferential direction to cross the axis d and including a first bridge part facing one cavity, a second bridge part facing the other cavity, and a magnet embedding hole formed to be adjacent to the first and the second bridge parts;
a first permanent magnet formed of a fixed magnetic force magnet in which a product of a coercive force and a magnetization direction thickness becomes great, the first permanent magnet being disposed in the magnet embedding hole to be adjacent to the first bridge part; and
a second permanent magnet formed of a variable magnetic force magnet in which a product of a coercive force and a magnetization direction thickness is less than that of the first permanent magnet, the second permanent magnet being disposed in the magnet embedding hole to be adjacent to the second bridge pact;
wherein the second bridge part is formed wider than the first bridge part.

* * * * *